Aug. 15, 1950        G. LISSAC        2,518,914
SUSPENSION TYPE SPECTACLE MOUNTING
Filed Oct. 30, 1945

Inventor
GEORGES LISSAC
By Haseltine, Lake & Co.
Attorneys

Patented Aug. 15, 1950

2,518,914

UNITED STATES PATENT OFFICE 2,518,914

SUSPENSION TYPE SPECTACLE MOUNTING

Georges Lissac, Paris, France

Application October 30, 1945, Serial No. 625,522
In France December 7, 1944

3 Claims. (Cl. 88—41)

The present invention relates to spectacles, and more particularly to a mount for spectacles providing an elastic and shock-resistant suspension for the lenses, of light and simple construction, and with a minimum number of elements.

For improving the field of vision through ophthalmic spectacles it has been proposed to reduce to a minimum all the elements of such spectacles which are not optically essential. It has thus been proposed to produce spectacles of the pince-nez type provided with temple bars. But such spectacles have the disadvantage that breakage often occurs at the weak points formed in the lenses by the means securing them to the corresponding temple bars.

In order to obviate this disadvantage, it has been heretofore proposed to do away with such means for securing the temple bars to the lenses, and to secure the temple bars to a member following substantially the upper outline of the lenses and remaining independent of the latter, said member being integral with the bridge piece i. e. with a member carrying the nose pads and the lens holding claws.

Even glasses so modified however are subject to certain shortcomings viz.

(a) They do not permit adjustment of the spacing between the optical centers of the lenses in order to bring them to a distance corresponding to the interpupillary distance of the wearer; in other words, for a given width of the bridge piece chosen to correspond to the width of the root of the nose and for a given size of lenses, the spacing between the optical centers of the lenses is fixed and this spacing does not correspond necessarily to the interpupillary distance of the wearer.

(b) The fastening means between the nose pads and the lenses, which means are arranged on each side of the nose, limit the field of vision.

(c) The bridge piece with its nose pads and lens securing means forms a heavy and ugly system.

My present invention has for its object ophthalmic spectacles obviating the various above-mentioned disadvantages. Such spectacles show the following characteristic features each of which forms a particular object of my invention.

(a) The glasses are secured to this suspension means at a suitable point of their upper edge.

(b) The spectacles include a principal member constituted by a brace supporting the different elements of the glasses, to wit: the lenses and their suspension means, the temple bars and the nose pads. This brace forms a single member fulfilling the function performed in prior art spectacles by the bridge piece and the means for connecting the same with the temple bars. It extends without a gap across the face of the wearer.

(c) The temple bars may be hinged to said brace.

(d) Each lens is secured to means carried at the end of a relatively long flexible lever arm which is secured to the brace at its other end so as to allow the lens to possess a certain yieldingness or elasticity.

By means of this arrangement, it is possible to obtain spectacles for all combinations of width of the face, width of the nose and interpupillary spacing by manufacturing mountings or frames which take into account the measurements of the wearer only as concerns the width of his face.

My invention will now be further described by reference to the accompanying drawings illustrating by way of example one form of embodiment of my invention. In the accompanying drawings.

Figure 1:
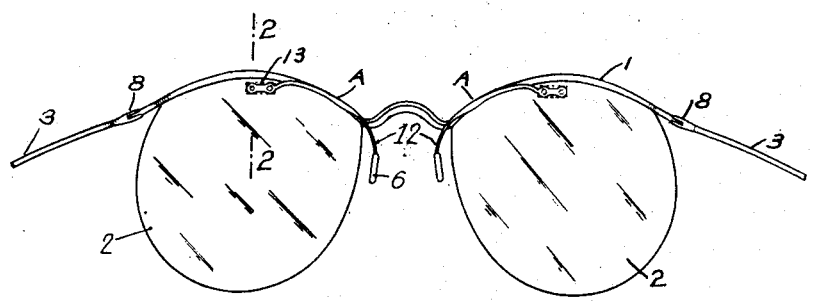
Fig. 1 is an elevational rear view of spectacles including a mount in accordance with my invention.
Figure 3:

Lastly Fig. 3 is a plan view at a larger scale of the lens securing means employed in the embodiment of Fig. 1.

As appears from Fig. 1, the spectacles include an upper main brace 1 to which are secured all the elements of the spectacles such as the lenses 2, the temple bars 3, the nose pads 6 and the lens supporting means. Said brace replaces the separate members secured to one another used in prior spectacles, viz. the connecting members between the temple bars and the bridge piece and the bridge piece itself which in such prior spectacles carried the means for supporting the lenses and the nose pads.

Except for the temple bars, the elements of the spectacles, viz. the lenses, their rims if any, and the nose pads, are connected to the brace by means of two relatively long flexible members 12, one for each half of the wearer's face.

The brace 1 thus extends across the nose and the entire width of the wearer's face and follows preferably the general line of the eyebrows.

The temple bars 3 may be secured as desired either by means of hinges 8 to the main brace 1 as shown or they may be formed integrally with the main brace 1 in which case the hinge is omitted.

The lens securing means in the example shown are located at the upper portion of the lenses instead of to the side thereof.

Thus, by properly positioning in the lenses the holes 10 which accommodate the pins 9 (Fig. 3), the lenses may be moved as desired towards or away from one another in order that the spacing between their optic axes may be adjusted to correspond with the interpupillary spacing of the wearer's eyes.

A further advantage of the above feature resides in that the means for securing the lenses to the lens supports lie in a zone which is of very small utility for vision purposes.

As illustrated in Fig. 1 the lens supporting members 12 are fastened to the main brace 1 at points A between the nose-spanning portion and the temporal ends of the main brace 1. Preferably the points A lie relatively close to the nose-spanning portion. The point of attachment so defined divides the members 12 into a resilient lens support and a pliable nose pad support. The resilient lens support extends temporally, preferably behind and hidden by the brace 1, to a point approximately in line with the optic axis of the lens, where the lens is fastened to it at its upper edge as by means such as the double pin arrangement shown in Figs. 2 and 3.

The lens supporting portion of the members 12 thus provides a cantilever spring for the support of the lens. The flexibility and resiliency of this cantilever spring guard the lens against breakage from shocks and stresses which it would not withstand when suspended from the more rigid structures of the prior art.

Support for the nose pad is provided by the portion of the member 12 extending inwardly and downwardly from the point of attachment at A. In view of its relative shortness this portion is pliable and permits ready accommodation of the nose pads 6 to the positions required by the wearer.

This construction is also of easier manufacture than systems employing separate lens and nose pad supports, and permits great strength in the attachment of these elements to the brace, by means of welding or fastening applied to the broad contact surface existing between the members 12 and the brace 1 at the point A.

Figure 2:
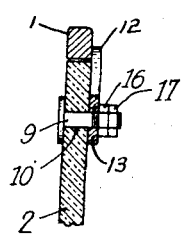
Fig. 2 is a cross section through line 2—2 of Fig. 1 at a larger scale.

In Figs. 2 and 3 I have illustrated with further detail a preferred means for securing the lenses to the suspension members 12.

The lens securing means of Figs. 2 and 3 comprise a flattened portion 13 formed at the outer or temporal extremity of the member 12, a double pin structure 9 having the general form of a staple, and means such as nuts 16 and 17 for fastening the pins 9 to the portion 13 of the member 12 after passing through holes 10 provided in the upper edge of the lens.

Of course the glasses which have been described hereinabove and which have been illustrated in the drawings may be modified in their details of execution within the scope of the invention.

What I claim is:

1. In a rimless spectacle mount comprising a brace extending transversely substantially along the wearer's eyebrows and across the nose and having a temple bar connected to each end thereof, the provision of two relatively long, flexible, lens-supporting members each having a portion extending behind and hidden by the brace, each said member being attached to the brace at a point thereof sufficiently spaced from the temples to permit resilient movement of the extending, hidden portion of the member relatively to the brace, each said member having also a dependent portion situated in the nasal region and having a nose pad thereon, a pair of lenses the upper edges of which conform to the shape of the brace, and lens securing means connected to the outer extremity of each said supporting member, said securing means comprising a first plate rigid with said member, a second plate having two pins thereon, the lens being apertured to receive said pins, and means for connecting said pins to said first plate through the apertures of said lens.

2. In a rimless spectacle mount comprising a brace extending transversely along the wearer's eyebrows and across the top of the nose and having a temple bar hinged to each end thereof, the provision of two relatively long flexible members each fixed to one side of said brace at a point intermediate the nasal region and the temple, each said member being divided by said point into a resilient lens support and a pliable nose-pad support, said lens support extending temporally from said point behind and hidden by said brace to provide a cantilever spring supporting a lens the upper edge of which conforms to the shape of the brace, said nose-pad support extending inwardly and downwardly from said point, and lens securing means connected to the outer extremity of said lens support and comprising two pins, the lens being drilled to allow passage of said pins therethrough.

3. In a spectacle mount comprising a brace extending transversely along the wearer's eyebrows and across the top of the nose and having a temple bar hinged to each end thereof, the provision of two relatively long flexible members each fixed to one side of said brace at a point intermediate the nasal region and the temple, each said member being divided by said point into a resilient lens support and a pliable nose-pad support, said lens support extending temporally from said point behind and hidden by said brace to provide a cantilever spring for supporting a lens and said nose-pad support extending inwardly and downwardly from said point.

GEORGES LISSAC.

REFERENCES CITED

The following references are of record in the file of this patent:

UNITED STATES PATENTS

| Number | Name | Date |
|---|---|---|
| D. 92,317 | Reynold | May 22, 1934 |
| 1,068,959 | Allen | July 29, 1913 |
| 1,972,479 | Ferris | Sept. 4, 1934 |
| 2,123,385 | Smith | July 12, 1938 |
| 2,130,692 | Mackahan et al. | Sept. 20, 1938 |
| 2,178,038 | Harbour | Oct. 31, 1939 |
| 2,236,304 | Snavely | Mar. 25, 1941 |
| 2,244,922 | Ruud | June 10, 1941 |
| 2,246,507 | Cozzens | June 24, 1941 |
| 2,250,243 | Williams | July 22, 1941 |
| 2,255,687 | Splaine | Sept. 9, 1941 |
| 2,373,650 | Brusell | Apr. 17, 1945 |
| 2,380,638 | D'Urbano | July 31, 1945 |